United States Patent [19]

Vali

[11] Patent Number: 4,613,749

[45] Date of Patent: Sep. 23, 1986

[54] PATTERN TRACER USING MATRIX SENSOR

[75] Inventor: Enn Vali, Burlington, Canada

[73] Assignee: Westinghouse Canada Inc., Hamilton, Canada

[21] Appl. No.: 598,438

[22] Filed: Apr. 9, 1984

[30] Foreign Application Priority Data

Jun. 1, 1983 [CA] Canada .................................. 429389

[51] Int. Cl.[4] ................................................ G05B 1/00
[52] U.S. Cl. .................................... 250/202; 250/234
[58] Field of Search ............... 250/234, 235, 236, 202; 318/577

[56] References Cited

U.S. PATENT DOCUMENTS 4,396,832  8/1983  Henderson ........................... 250/202

Primary Examiner—Gene Wan
Attorney, Agent, or Firm—Edward H. Oldham

[57] ABSTRACT

An optical pattern follower uses a photo matrix to scan a pattern. The scan pattern is determined by generating a series of point addresses storing such addresses and interrogating the matrix only when the point address in the matrix being scanned corresponds to an address in the store. The resulting signals are processed to produce direction velocity signals which cause the follower to follow the pattern at a predetermined tangential velocity.

10 Claims, 2 Drawing Figures

PATTERN TRACER USING MATRIX SENSOR

BACKGROUND OF THE INVENTION

1. Field of the Invention

Optical pattern tracers are well known in the machine tool field and are commonly used to control the cutting of various machine tools, particularly gas and flame cutting machines which may be caused to cut specific shapes from material based upon a predetermined pattern. One class of such pattern tracers is optical pattern tracers which view a pattern, such as a dark silhouette or line on a white surface, and cause the tracer and its associated machine tool to follow the convolutions of the pattern. One of the preferred forms of optical tracers scans a circular area repetitively crossing the edge of the pattern and producing an electrical signal representative of the change of reflectance as the scanning action crosses the edge of the pattern. This electrical signal is then used, together with a reference signal and other information, to produce coordinate drive information to control X and Y drive motors which cause the machine to move with constant tangential velocity around the pattern.

With increasing sophistication of such equipment, the additional information which must be derived can produce quite complex electronic circuitry to enable the machine to identify not only the pattern itself but auxiliary marks associated with the pattern, sometimes called command marks, discontinuities in the pattern, and other conditions which give rise to special problems.

2. Description of the Related Art

Typical of the tracers of this class are those described in:

U.S. Pat. No. 3,704,372 issued Nov. 28, 1972 to Robert E. Parker, et al;

U.S. Pat. No. 3,727,120 issued April 10, 1973 to George S. Jewell, et al;

U.S. Pat. No. 3,860,862 issued Jan. 14, 1975 to William Dell, et al;

U.S. Pat. No. 3,883,735 issued May 13, 1975 to Francis P. Murphy, et al.

SUMMARY OF THE INVENTION

In accordance with the present invention the scanning action, rather than being produced by a mechanical device as described in the art cited above, is produced using a photo matrix and by means of suitable electronic circuitry the pattern viewed by the matrix is sampled in a circular form. The circle of sampled areas on the matrix is of a predetermined diameter and centred on a point within the matrix at a location determined by the desired kerf correction and pattern direction.

In a further modification of the system a second circle of sampled areas is established, of greater diameter than the first circle but having the same centre. The photo matrix develops signals in response to the light impinging on it, in this case the pattern to be followed.

The circular sampling areas restrict the signals derived from the matrix to those produced by elements of the photo matrix defined by circles of sampled areas.

The resulting signals are processed to select signals indicative of a pattern edge or other transition from one reflectance level to another. The selected signals are then processed to produce signals representative of pattern relative direction. The signals indicative of pattern relative direction are then used to produce suitable coordinate velocity signals which, when applied to x and y drive motors cause the machine to move with constant velocity around the pattern. The signals representative of pattern relative direction are also used to establish the centre of scan in the matrix.

Further signals indicative of pattern change of relative direction or command marks may also be derived and used to control the machine as desired.

BRIEF DESCRIPTION OF THE DRAWINGS

A clearer understanding of my invention may be had from the following description of the preferred embodiments together with the drawings in which.

DESCRIPTION OF PREFERRED EMBODIMENTS

Figure 1:
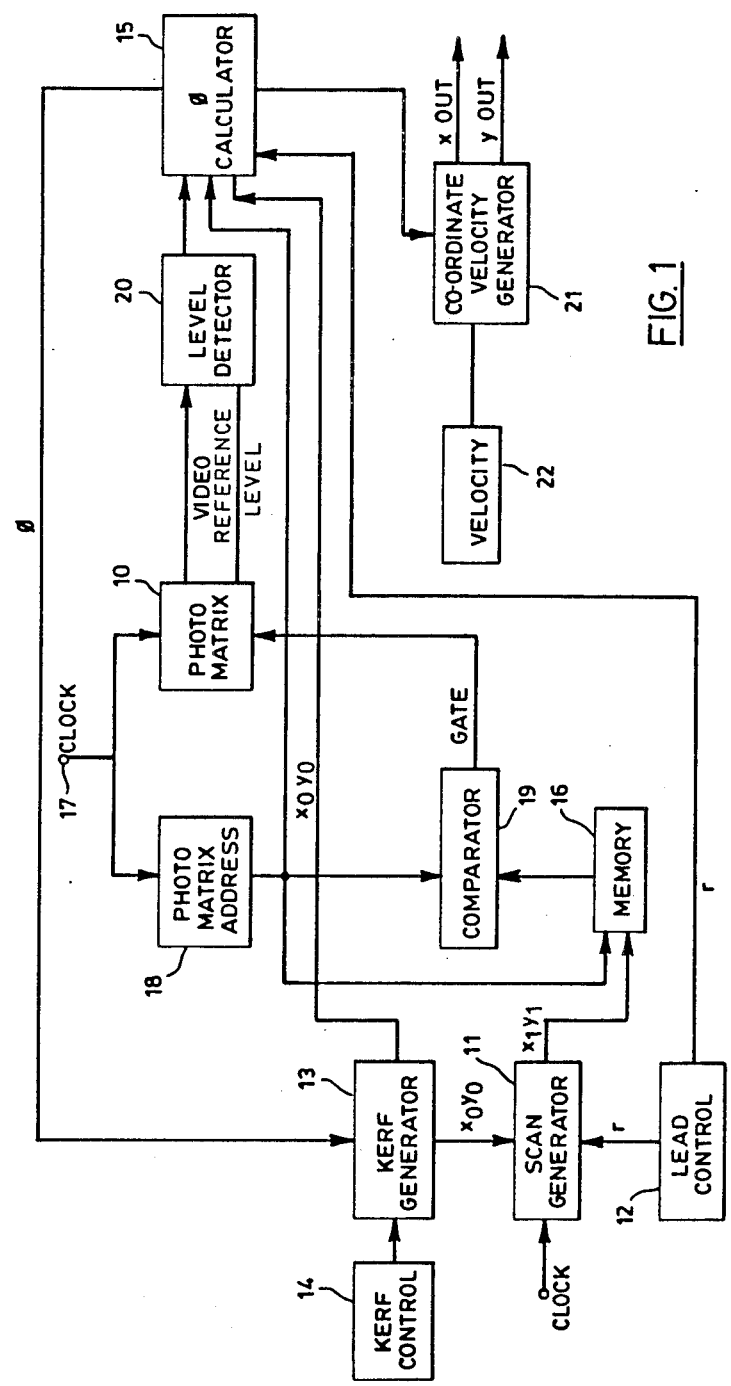
FIG. 1 is a block diagram of a first embodiment of the invention.

As seen in FIG. 1 a photo matrix comprising a large number of image sensor elements is used to view the pattern to be traced. Typical of such photo matrices is the Fairchild CCD 211 which is a solid-state charge-coupled device including 244×190 individual elements, together with other related registers and auxiliary devices.

The pattern to be traced is illuminated and projected by a suitable optical system (not shown) onto the photo matrix. The locations of the elements of the matrix which are to be interrogated are determined by the scan generator 11.

The scan generator 11 combines the lead information "r" from lead control 12 with kerf information "$x_o$, $y_o$" from the kerf generator 13 which in turn has derived the kerf displacement information "k" from kerf control 14 and information from $\phi$ calculator 15.

The scan generator generates a series of point locations corresponding to addresses in the photo matrix which define a circle of radius "r" with its centre "$x_o$, $y_o$" determined by the kerf value "k" and the angular direction value $\phi$. These point locations are stored in memory 16. A clock pulse on terminal 17 applied to photo matrix 10 causes the matrix to be scanned in a simple raster or a raster similar to the standard T.V. interlaced raster. At the same time the address of the element in the photo matrix being scanned is derived from photo matrix address generator 18.

The address from 18 is compared to the points stored in memory 16 in comparator 19. When the address corresponds to a stored point a gate signal is applied to the photo matrix permitting a video signal to be applied to level detector 20. A reference level from the photo matrix is applied to the level detector and video signals, of a specified level greater than the reference level, are applied to $\phi$ calculator 15.

It will be understood that the pattern to be traced as projected onto photo matrix 10 will cause a change of video level from the photo elements on which it impinges. Since only those elements corresponding to the stored scan are interrogated, i.e. gated, the level detected video output will represent the intersections of the scan and the pattern.

The $\phi$ calculator combines the gated video signals in the form of matrix addresses with the centre of scan information "$x_o$, $y_o$" and the scan radius "r" to produce an output representative of the angular direction of the pattern relative to the matrix.

This $\phi$ output or angular information is applied to the coordinate velocity generator 21. Also applied to the latter is a velocity signal from velocity control 22. The resultants are a pair of x and y velocity output signals which are used to control the x and y drives of the tracer.

In operation the operator sets the desired kerf, lead and velocity. It may be desirable to intercouple the lead and velocity controls so that the machine always has sufficient lead to respond to rapid changes of direction. As soon as these values are set, the scan generator generates the points defining the scan location which are stored in the memory 16. On the first scan, and until a pattern is encountered, the value of $\phi$ can be fixed or derived from manual steering signals used to manually steer the tracer to the pattern.

Once the scan has been generated and stored the photo matrix is scanned and intercepts produce the gated video which in turn results in a $\phi$ calculation. The $\phi$ calculation is initiated by completion of a raster scan of the photo matrix as indicated by the matrix address from 18. The $\phi$ so generated is stored and retained until the next scan is completed.

As each $\phi$ is generated, a new value of "$x_o$, $y_o$" is calculated by the kerf generator and a new set of points defining the scan is stored in memory 16.

In order to calculate $\phi$ and any other information regarding the pattern such as command marks, reverse direction, etc. the $\phi$ calculator needs only a simple memory to store the intercept addresses and an arithmetic unit to process "$x_o$, $y_o$", "r" and the intercept information.

Figure 2:
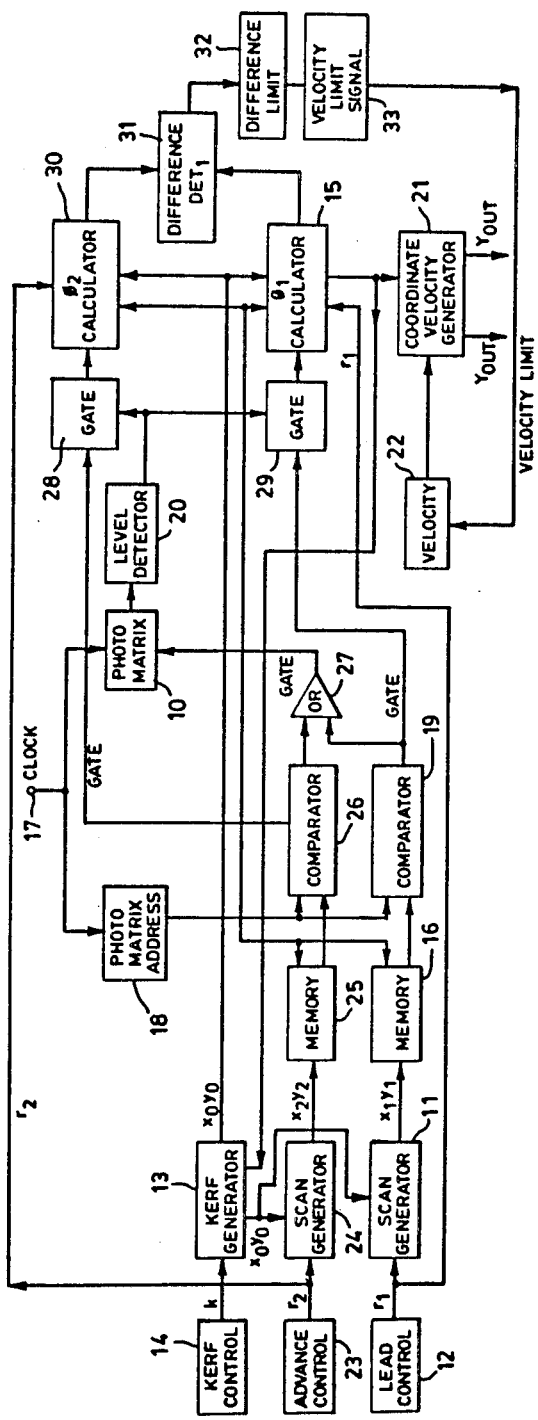
FIG. 2 is a block diagram of a further embodiment of the invention.

An alternative system is illustrated in FIG. 2 which provides additional information regarding the direction of the pattern. The same designations have been used in FIG. 2 to represent elements which correspond to elements in FIG. 1.

In FIG. 2 an additional scan generator 24 is provided which, under the control of advance control 23, generates a series of point locations corresponding to addresses in the photo matrix which define a circle of radius $r_2$ as compared to the circle defined by scan generator 11 which has a radius $r_1$. Radius $r_2$ is greater than radius $r_1$.

These point locations from generator 24 are stored in memory 25.

As in FIG. 1 the addresses in memory 16 are compared with the photo matrix address in comparator 19 and produce an output when there is a coincidence. Similarly, the addresses in memory 25 are compared with the photo matrix addresses in comparator 26 and produce an output when there is a coincidence.

The outputs from comparators 19 and 26 are both applied to "OR" gate 27 and if either signal is present a gate signal is applied to the photo matrix. As before, the output from the photo matrix 10 is applied to a level detector 20 which produces an output when the output from the photo matrix exceeds a given value.

To distinguish between the pattern as viewed on the scan of diameter $r_1$ and the pattern as viewed on the scan of diameter $r_2$ it is necessary to provide two gates 29 and 28 which are actuated by the output from comparators 19 and 26 respectively. The output from gate 29, when enabled by a signal from comparator 19, permits the signal from the photo matrix 10 to be applied to $\phi$ calculator 15. The output from gate 28, when enabled by a signal from comparator 26, permits the signal from the photo matrix to be applied to $\phi$ calculator 30. To distinguish the two $\phi$ values they have been designated $\phi_1$ and $\phi_2$ respectively.

As before, the $\phi_1$ signal is applied to the coordinate velocity generator 21 and, together with the velocity signal from velocity control 22, produces the coordinate control signals x out and y out which control the coordinate drives.

The $\phi_1$ signal is also applied to difference detector 31 and there compared to the $\phi_2$ signal to produce a difference output which indicates the amount of change of direction of the pattern between the point scanned by a scan of diameter $r_1$ and the point scanned by a scan of diameter $r_2$.

This difference output is applied to difference limit 32 which produces an output if the difference exceeds a set value.

As shown, the output from difference limit 32 is applied to velocity limit signal generator 33. The output from this generator is a velocity limit signal which is applied to velocity generator 22. Thus the maximum velocity of the system may be limited by the rate of change of direction of the pattern.

While not specifically illustrated, the difference limit output may also be used to control other functions which must vary depending upon the rate of change of direction of the pattern.

In operation, the system of FIG. 2 performs in a manner similar to the system of FIG. 1 with the added facility that it is capable of viewing the pattern in advance of the tracing point and making adjustments to the system in accordance with changes in pattern direction so detected.

Systems which include gates to distinguish between the pattern and command marks may use the system of either FIG. 1 or FIG. 2 and command marks detected by the scan of radius $r_2$ and gated through gate 28 may be used for special advance command control.

It will also be understood that the signals processed in either $\phi$ calculator may be gated to distinguish forward intercepts from rear intercepts or command marks etc. in a manner well known in the art and explained for example in Canadian Pat. No. 1,082,333, issued July 22, 1980, in the name of Westinghouse Canada Inc.

While the systems have been described as though they consisted of a number of separate functional components it will be understood that many of the functions could be provided by a single micro processor with suitable programming.

The embodiments of the invention in which an exclusive property or privilege is claimed are defined as follows:

1. An optical pattern tracer including a photo matrix, means to optically project a portion of said pattern onto said matrix, means to generate a first series of addresses representative of a predetermined closed geometric figure in said matrix, means to interrogate those elements in said matrix located at said addresses, means to generate signals indicative of coincidence of said pattern and interrogated elements, means to derive from said signals a directional signal indicative of the direction of said pattern relative to a reference direction in said matrix, means to generate a velocity signal representative of a desired tangential tracing velocity, means to combine said velocity signal and said directional signal to produce a pair of coordinate velocity signals and means to move said photo matrix in a plane parallel to the plane of said pattern with coordinate velocities proportional to said coordinate velocity signals and thereby move said matrix at a velocity proportional to said velocity signal in a directional tangential to said pattern.

2. An optical pattern tracer as claimed in claim 1 wherein said geometric figure is an ellipse.

3. An optical pattern tracer as claimed in claim 2 wherein said addresses are stored in a memory.

4. An optical pattern tracer as claimed in claim 1 wherein said geometric figure is a circle of selectable diameter.

5. An optical pattern tracer as claimed in claim 4 wherein the centre of said circle is off-set from the geometric centre of said matrix by an amount equal to a selected kerf allowance.

6. An optical pattern tracer as claimed in claim 5 wherein the off-set of the centre of the circle is in a direction at right angles to said directional signal.

7. An optical pattern tracer as claimed in claim 4 including a second series of addresses representative of a second circle of diameter greater than the selected diameter of the first circle but concentric therewith.

8. An optical pattern tracer as claimed in claim 7 including means to generate signals indicative of coincidence of the pattern and both said first series of addresses and said second series of addresses, means to distinguish between signals representing coincidence of the pattern and matrix elements having said first series of addresses and signals representing coincidences of the pattern and matrix elements having said second series of addresses and means to derive a second directional signal representative of the direction of said pattern at a point located on said second circle.

9. An optical pattern tracer as claimed in claim 8 including means to compare said directional signal and said second directional signal and produce a control signal when the difference in said directional signals exceed a certain value.

10. An optical pattern tracer as claimed in claim 9 wherein said control signal is used to limit said velocity signal.

* * * * *